(No Model.) 2 Sheets—Sheet 1.

W. A. GOODYEAR.
APPARATUS FOR HEATING WATER, &c., FOR DOMESTIC AND OTHER PURPOSES.

No. 294,992. Patented Mar. 11, 1884.

WITNESSES
Wm A. Skinkle
Carrie E. Ashley

INVENTOR
Watson A. Goodyear,
By his Attorneys
Pope Edgecomb & Butler

N. PETERS, Photo-Lithographer, Washington, D. C.

(No Model.) 2 Sheets—Sheet 2.
W. A. GOODYEAR.
APPARATUS FOR HEATING WATER, &c., FOR DOMESTIC AND OTHER PURPOSES.
No. 294,992. Patented Mar. 11, 1884.
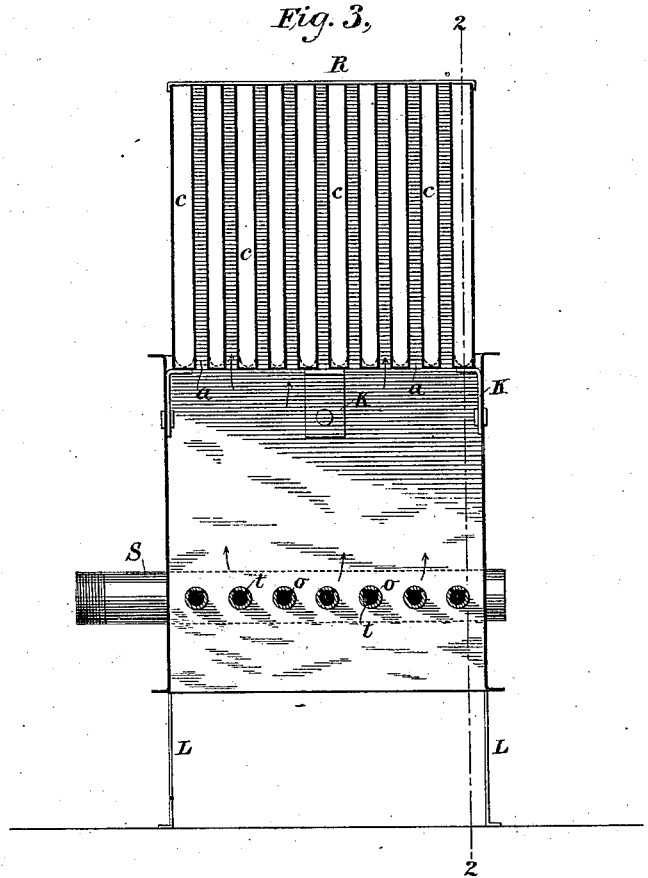
WITNESSES
Wm A. Skinkle
Carrie E. Ashley
INVENTOR
Watson A. Goodyear,
By his Attorneys
Pope Edgecomb & Butler

UNITED STATES PATENT OFFICE.

WATSON A. GOODYEAR, OF NEW HAVEN, ASSIGNOR OF ONE-HALF TO LANDON KETCHUM, OF SAUGATUCK, CONNECTICUT.

APPARATUS FOR HEATING WATER, &c., FOR DOMESTIC AND OTHER PURPOSES.

SPECIFICATION forming part of Letters Patent No. 294,992, dated March 11, 1884.

Application filed October 6, 1883. (No model.)

*To all whom it may concern:*

Be it known that I, WATSON A. GOODYEAR, a citizen of the United States, residing at New Haven, in the county of New Haven and State of Connecticut, have invented a new and useful Apparatus for Heating Water and other Fluids for Domestic and other Purposes, of which the following is a specification.

The object of my invention is to provide an apparatus capable of heating water or other fluids in any desired quantities in as short space of time as practicable.

The invention consists in constructing the vessel in which the liquid is heated in such a form as to present to the heating medium as great an extent of surface as practicable without at the same time rendering the apparatus bulky. For this purpose the vessel is constructed with a series of narrow perpendicular compartments or chambers for containing the fluids. These chambers are placed parallel with each other, and communicate each with its adjacent one at their extremities. The fluid-containing chambers are separated from each other by intervening spaces constituting flues for the flame or heated air employed for heating the surfaces of the fluid-chambers. It is not necessary that the heat should be supplied to the heating-vessel in any particular manner, as it may be placed over any ascending current of hot air or other medium; but I prefer to supply the heat by means of an apparatus in the nature of a gas-stove.

The vessel and gas-stove will be more fully described in connection with the accompanying drawings, in which—

Figure 1:
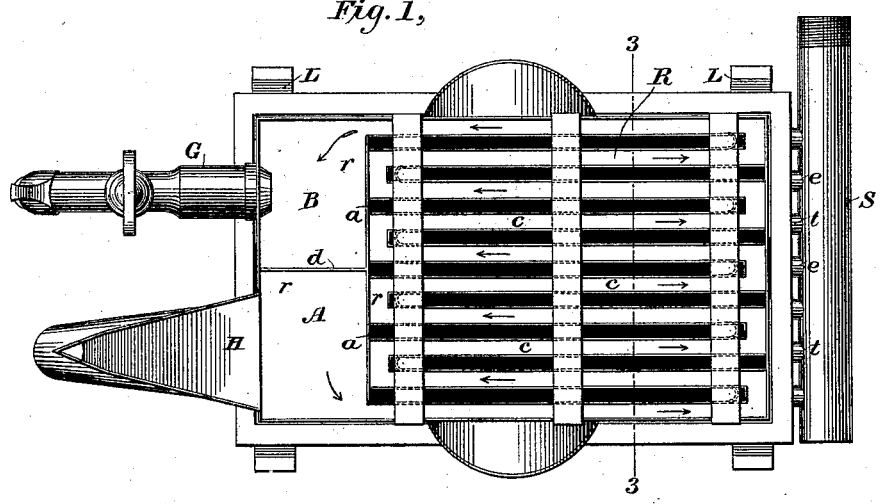
Figure 2:
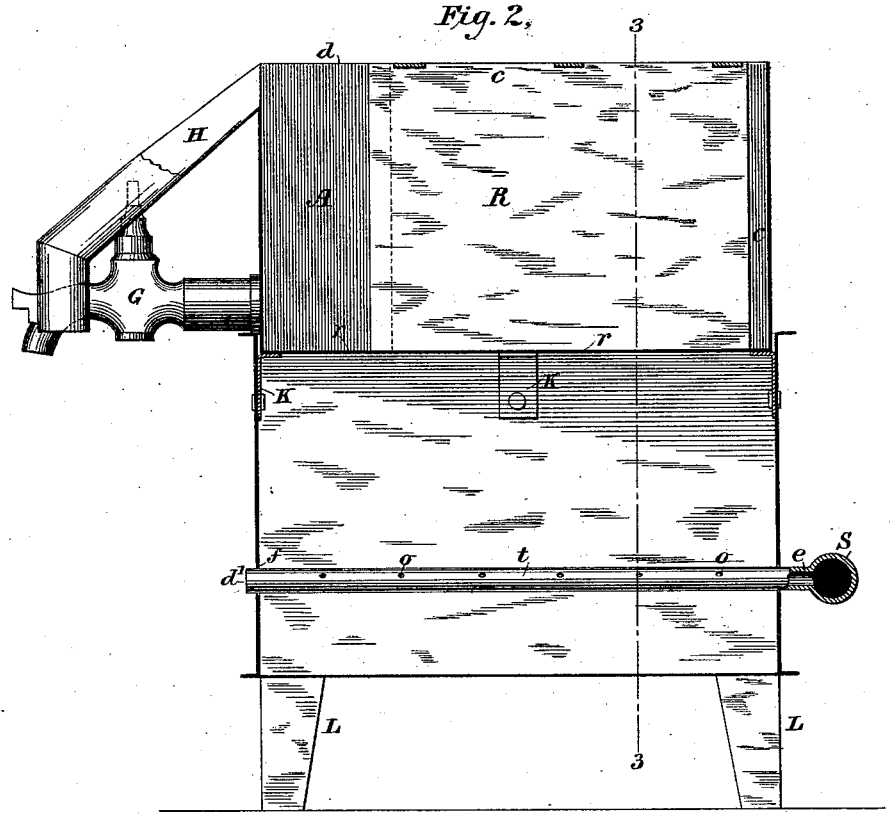

Figure 1 is a plan view of the entire apparatus; Fig. 2, a vertical longitudinal section of the heating-vessel and gas-stove, and Fig. 3 a vertical cross-section of the heating-vessel and gas-stove.

Similar letters refer to similar parts throughout the several views.

The heating-vessel R, Fig. 1, is made of sheet-copper or other metal, of any desired thickness. It may be rectangular or square in horizontal section, and of any desired proportion and height. It is provided with a bottom, $r\ r$, of the same material. The interior of the vessel is divided by similar sheets of metal into a series of parallel connected compartments, $c\ c$, Figs. 1 and 3, and the whole is soldered or brazed together, so as to be liquid-tight. These compartments may be of any desired width, and their length and height will vary according to the dimensions of the vessel. Their general direction may be parallel or perpendicular to the greatest dimension of the vessel, and their arrangement is best seen by reference to Fig. 1. If desired, all the corners of the compartments may be rounded off, as shown by the dotted lines in Figs. 1 and 3. The bottom $r\ r$ is constructed with open spaces $a\ a$, Figs. 1 and 3, between the sides of the adjacent fluid-compartments $c\ c$, for the purpose of allowing the heat to pass up between and around the water-compartments, as indicated by the arrows in Fig. 3. The series of compartments terminates in the chambers A and B, Fig. 1, which are made by dividing the space in the interior of the heating-vessel not occupied by the connected compartments $c\ c$ into two equal portions by means of a sheet-metal wall, $d$. The fluid to be heated is supplied to the compartment A, and traverses the compartments $c\ c$ in succession, as indicated by the arrows, and emerges into the chamber B, whence it is drawn off by a stop-cock, G.

Attached to the top of the chamber A is an overflow-spout, H, to which a tube may be attached for the purpose of carrying off the overflow, and avoiding constant regulation of stop-cock G whenever a constant stream is flowing through the heating-vessel.

The apparatus for supplying heat to the vessel is made of sheet-iron or any other metal, of any desired thickness, and is supported by the legs L L, as shown in Figs. 1, 2, and 3. Its size and shape in the horizontal direction are determined by the size and shape of the heating-vessel R, to which it is to be applied. The dimensions should, however, allow the vessel to fit tightly within the top of the gas-stove and rest on the brackets K K. It is open both at its top and bottom, and it may be of any desired height. The gas is supplied by means of any desired number of parallel tubes, $t\ t$, of any suitable size and material. These tubes are closed at one extremity, $d'$, Fig. 2, and the opposite extremities, $e\ e$, are fitted into a supply-pipe, S, Figs. 1 and 2, which may be of any suitable material and size. The tubes *t t* are supported under the vessel by being passed through holes formed in the end walls, *f f*, as shown in Figs. 1 and 2, and they are perforated with any number of holes, *o o*, of any desired size, forming jets at which the gas is burned as it escapes.

I claim as my invention—

1. In an apparatus for heating water and other liquids, a metallic heating-vessel, R, divided internally into a series of parallel vertical compartments, *c c*, connected with each other and terminating in the chambers A and B, through which the liquid to be heated passes, and having the open spaces *a a* between all the compartments, whereby the vessel is divided vertically, substantially as and for the purposes specified.

2. The combination, substantially as hereinbefore set forth, of the parallel water-heating compartments or chambers communicating with each other in series, the intervening spaces constituting flues for heating said compartments, the supply and discharging chambers A and B, in which the respective ends of said series of compartments terminate, and an overflow-spout leading from the upper portion of said supply-chamber.

3. The combination, substantially as hereinbefore set forth, of a narrow continuous water-heating chamber folded or wound upon itself throughout its entire length, so as to leave a narrow flue intervening between each adjacent fold, and terminating at both extremities in enlarged chambers or compartments.

4. The combination, substantially as hereinbefore set forth, with a heating-vessel consisting of a continuous narrow water-containing chamber folded or wound upon itself, and having heating-flues intervening between the successive folds, substantially as described, of a gas-stove consisting of the horizontal gas-burner J, composed of parallel pipes *p p*, leading from the supply-pipe S, and extending within an inclosing-case of suitable proportions for receiving said water-containing chamber, substantially as described.

In testimony whereof I have hereunto subscribed my name this 1st day of October, A. D. 1883.

WATSON A. GOODYEAR.

Witnesses:
WALTER POND,
PHILIP POND.